United States Patent
Good et al.

(10) Patent No.: US 8,600,996 B2
(45) Date of Patent: Dec. 3, 2013

(54) USE OF INFERENCE TECHNIQUES TO FACILITATE CATEGORIZATION OF SYSTEM CHANGE INFORMATION

(75) Inventors: Tom Good, Portland, OR (US); Gene Kim, Portland, OR (US); David Whitlock, Portland, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 12/633,747

(22) Filed: Dec. 8, 2009

(65) Prior Publication Data

US 2011/0137905 A1  Jun. 9, 2011

(51) Int. Cl.
G06F 7/00 (2006.01)
G06F 17/30 (2006.01)

(52) U.S. Cl.
USPC ............ 707/740; 707/687; 707/737; 707/754

(58) Field of Classification Search
USPC .................................. 707/687, 737, 740, 754
See application file for complete search history.

(56) References Cited

U.S. PATENT DOCUMENTS

| | | | |
|---|---|---|---|
| 6,529,784 B1 * | 3/2003 | Cantos et al. | 700/79 |
| 6,938,081 B1 | 8/2005 | Mir | |
| 7,243,348 B2 | 7/2007 | Good et al. | |
| 7,316,016 B2 | 1/2008 | DiFalco | |
| 7,360,099 B2 | 4/2008 | DiFalco et al. | |
| 7,490,322 B2 | 2/2009 | Pichetti et al. | |
| 7,519,624 B2 * | 4/2009 | Korupolu et al. | 1/1 |
| 7,587,754 B2 | 9/2009 | DiFalco et al. | |
| 7,620,715 B2 | 11/2009 | DiFalco et al. | |
| 7,711,703 B2 * | 5/2010 | Smolen et al. | 707/609 |
| 7,765,460 B2 | 7/2010 | DiFalco et al. | |
| 7,822,724 B2 | 10/2010 | DiFalco et al. | |
| 7,860,222 B1 * | 12/2010 | Sidler et al. | 379/32.01 |
| 8,140,635 B2 | 3/2012 | DiFalco | |
| 8,145,752 B2 * | 3/2012 | Dee | 709/224 |
| 8,176,158 B2 | 5/2012 | DiFalco et al. | |
| 2002/0078382 A1 | 6/2002 | Sheikh et al. | |
| 2004/0024843 A1 | 2/2004 | Smith | |
| 2004/0122962 A1 | 6/2004 | DiFalco et al. | |
| 2005/0015436 A1 * | 1/2005 | Singh et al. | 709/203 |
| 2005/0050068 A1 * | 3/2005 | Vaschillo et al. | 707/100 |
| 2005/0060567 A1 * | 3/2005 | Shannon et al. | 713/200 |
| 2005/0183143 A1 * | 8/2005 | Anderholm et al. | 726/22 |
| 2005/0193039 A1 * | 9/2005 | Adiba et al. | 707/204 |

(Continued)

OTHER PUBLICATIONS

Office Action dated Sep. 30, 2011, in U.S. Appl. No. 12/633,743, 16 pages.

(Continued)

*Primary Examiner* — Wilson Lee
*Assistant Examiner* — Jessica N Le
(74) *Attorney, Agent, or Firm* — Klarquist Sparkman, LLP

(57) ABSTRACT

Methods, systems, and articles for receiving, by a monitor server, change data associated with a change captured on a target host, are described herein. In various embodiments, the target host may have provided the change data in response to detecting the change, and the change data may include one or more rules, settings, and/or parameters. Further, in some embodiments, the monitor server may analyze the change data in order to group the change data into clusters. Once the change data have been classified as clusters, a report may be generated providing classification or categorization and cluster information for the various changes. In various embodiments, the generating may comprise generating a report to the target host and/or to an administrative user.

18 Claims, 4 Drawing Sheets

(56) References Cited

U.S. PATENT DOCUMENTS

| | | | |
|---|---|---|---|
| 2006/0111880 A1* | 5/2006 | Brown et al. | 703/1 |
| 2006/0123133 A1* | 6/2006 | Hrastar | 709/238 |
| 2006/0161879 A1* | 7/2006 | Lubrecht et al. | 717/101 |
| 2006/0242277 A1 | 10/2006 | Torrence et al. | |
| 2007/0028304 A1* | 2/2007 | Brennan | 726/24 |
| 2007/0039049 A1* | 2/2007 | Kupferman et al. | 726/22 |
| 2007/0043786 A1 | 2/2007 | DiFalco et al. | |
| 2007/0124255 A1 | 5/2007 | DiFalco et al. | |
| 2007/0180490 A1* | 8/2007 | Renzi et al. | 726/1 |
| 2007/0299882 A1* | 12/2007 | Padgett et al. | 707/201 |
| 2008/0065702 A1* | 3/2008 | Dickerson et al. | 707/202 |
| 2008/0134050 A1* | 6/2008 | Franceschelli et al. | 715/740 |
| 2008/0183603 A1* | 7/2008 | Kothari et al. | 705/30 |
| 2009/0037492 A1* | 2/2009 | Baitalmal et al. | 707/201 |
| 2009/0094336 A1* | 4/2009 | Echevarria et al. | 709/206 |
| 2009/0094584 A1* | 4/2009 | Dheap et al. | 717/130 |
| 2009/0177710 A1* | 7/2009 | Holenstein et al. | 707/201 |
| 2009/0287818 A1 | 11/2009 | Tachibana et al. | |
| 2009/0300641 A1* | 12/2009 | Friedman et al. | 718/104 |
| 2009/0319653 A1* | 12/2009 | Lorenz et al. | 709/224 |
| 2010/0005107 A1* | 1/2010 | DiFalco | 707/100 |
| 2010/0023612 A1* | 1/2010 | Yoshida et al. | 709/223 |
| 2010/0325472 A1* | 12/2010 | Allen et al. | 714/3 |
| 2011/0093588 A1* | 4/2011 | Karayi et al. | 709/224 |
| 2011/0138038 A1 | 6/2011 | Good et al. | |
| 2011/0138039 A1 | 6/2011 | Good et al. | |
| 2011/0197094 A1 | 8/2011 | Wagner | |
| 2011/0197189 A1 | 8/2011 | Wagner et al. | |
| 2011/0197205 A1 | 8/2011 | Wagner et al. | |
| 2011/0264787 A1* | 10/2011 | Mickens et al. | 709/224 |
| 2012/0023076 A1 | 1/2012 | Torrence et al. | |
| 2012/0179805 A1 | 7/2012 | DiFalco | |
| 2012/0259960 A1* | 10/2012 | Sharma et al. | 709/221 |
| 2012/0291030 A1* | 11/2012 | Fitzgerald et al. | 718/1 |
| 2013/0124528 A1* | 5/2013 | Gourdol et al. | 707/740 |

OTHER PUBLICATIONS

Office Action dated Aug. 17, 2011, in U.S. Appl. No. 12/633,734, 15 pages.

Final Office Action dated Mar. 2, 2012, in U.S. Appl. No. 12/633,734, 16 pages.

Office Action dated Jun. 21, 2012, in U.S. Appl. No. 12/633,743, 17 pages.

Office Action dated Mar. 7, 2013, in U.S. Appl. No. 12/633,743, 16 pages.

* cited by examiner

USE OF INFERENCE TECHNIQUES TO FACILITATE CATEGORIZATION OF SYSTEM CHANGE INFORMATION

TECHNICAL FIELD

Embodiments relate to the field of compliance assessment, in particular to methods and apparatuses for using inference techniques to facilitate categorization of system change information.

BACKGROUND

Generally, most organizations that utilize computer systems and networks monitor those systems and networks for changes. This monitoring is often initiated and performed by a server that requests a number of client settings from monitored computing devices, servers, peripheral devices, etc. within the system or network. Upon receiving the settings, the server may then analyze, classify, and/or store them, and issue a report that indicates changes to the settings. Often, such a report includes numerous occurrences of various changes. Indeed, the number of occurrences may be so numerous that it renders the report nearly useless.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments include, but are not limited to, methods, systems, and articles for receiving, by a monitor server, change data associated with a change captured on a target host. In various embodiments, the target host may have provided the change data in response to detecting the change, and the change data may include one or more rules, settings, and/or parameters. Further, in some embodiments, the target host may detect a change to a rule, setting, or parameter based on a collection policy defining what change data is to be collected by the target host and provide data associated with the rule, setting, or parameter as change data to the monitor server.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
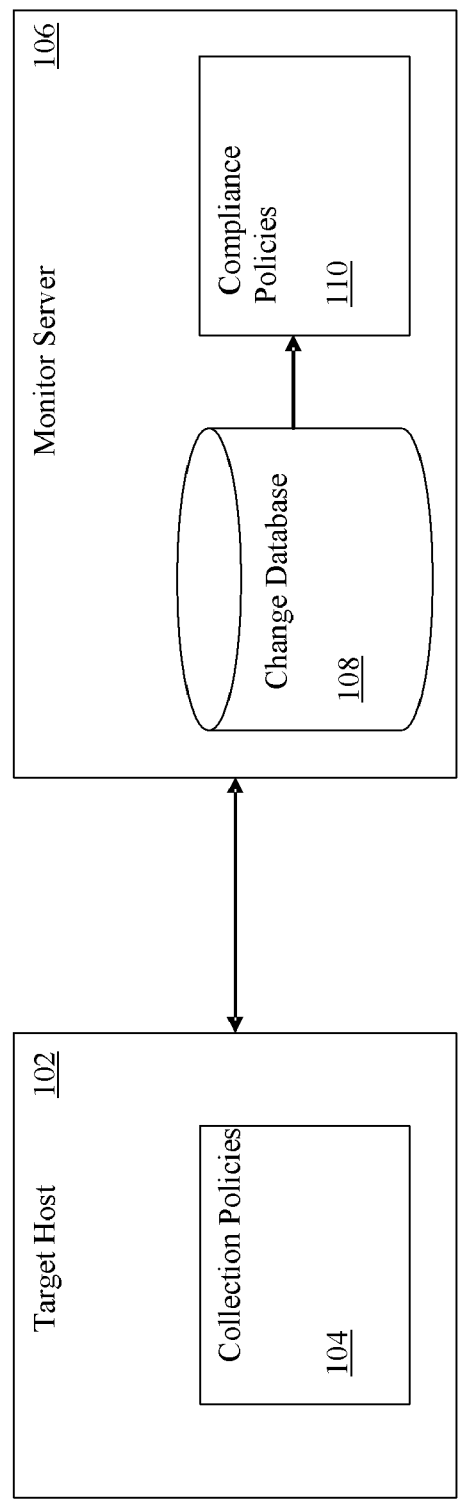
FIG. 1 illustrates a system-level view of various embodiments of the disclosure.

FIG. 1 illustrates a system-level view of various embodiments of the disclosure. As illustrated, a target host 102 may be communicatively coupled to a monitor server 106. The monitor server 106 may monitor the target host 102 for changes and may determine whether rules, settings, and/or configuration parameters of the target host 102 have changed and, in various embodiments, may determine whether the rules, settings, and/or configuration parameters of the target host meet one or more compliance policies 110.

In various embodiments, target host 102 may include one or more rules or collection policies 104 for use in capturing changes to data of the target host 102, such as changes to rules, settings, and/or configuration parameters. Upon detecting/capturing a change, the target host 102 may provide data associated with the change to the monitor server 106 to store in a change database 108 of the monitor server 106. The monitor server 106 may then look up all compliance policies 110 that match collection policies or rules 104 specified in the received change data. In some embodiments, the monitor server 106 may filter the change data and conditionally determine whether one or more rules, settings, and/or parameters of the change data meet one or more compliance policies 110. The determining may include evaluating an expression of at least one of the compliance policies 110 against element data specified in the change data. In various embodiments, the monitor server 106 may then generate test results based on whether the compliance policies 110 were met. In one embodiment, the monitor server 106 may further generate a report. The report may then be provided to target host 102, and/or an administrative user of monitor server 106, or to some other system.

Figure 4:
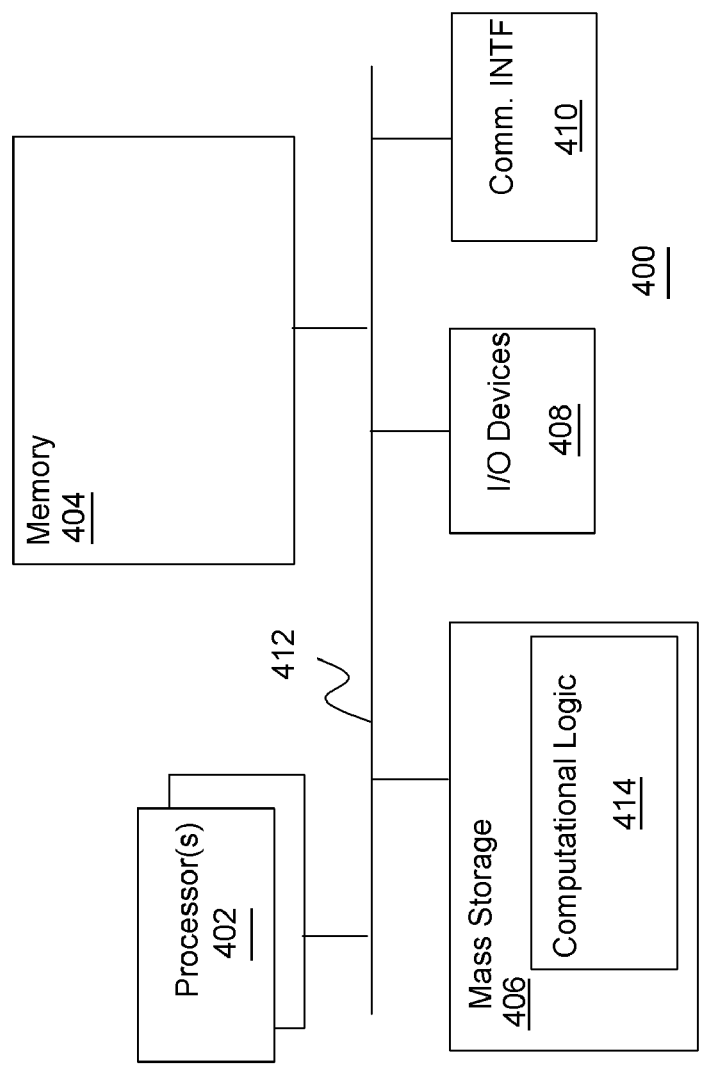
FIG. 4 illustrates an example computer system suitable for use to practice aspects of various embodiments.

In various embodiments, target host 102 and monitor server 106 may be any sort of computing devices known in the art. The computing devices may be personal computers (PC), workstations, servers, routers, mainframes, modular computers within blade servers or high-density servers, personal digital assistants (PDA), entertainment centers, set-top boxes, or mobile devices. An exemplary computing device is illustrated by FIG. 4, and will be described in greater detail herein. Target host 102 may be some type of peripheral device or service device, such as, for example, a printer, a copier, a fax machine, etc.

In some embodiments, monitor server 106 and target host 102 may be deployed on computing devices of the same organization. In other embodiments, monitor server 106 may belong to a separate organization, such as a compliance monitoring organization whose purpose is to monitor and ensure industry standards. Also, in one embodiment, target host 102 and monitor server 106 may be separate logical components or virtual machines of the same computing device.

In various embodiments, as mentioned above, target host 102 may have one or more collection policies or rules 104, and monitor server 106 may have a change database 108 and one or more compliance policies 110. These components and associated data and logic are also illustrated in FIG. 2 and will be described herein in greater detail.

In various embodiments, where target host 102 and monitor server 106 are remotely disposed from each other, they may be communicatively coupled to each other. In some embodiments, the computing devices may be coupled by a networking fabric (not illustrated). Such a networking fabric may include one or more of a local area network (LAN), a wide area network (WAN), and the Internet, as is known in the art. In one embodiment, the networking fabric may comprise a private network or a virtual private network (VPN) that may utilize tunneling. In some embodiments, where target host 102 and monitor server 106 belong to the same organization, they may be coupled by one or more private LANs or WANs of the organization.

Figure 2:
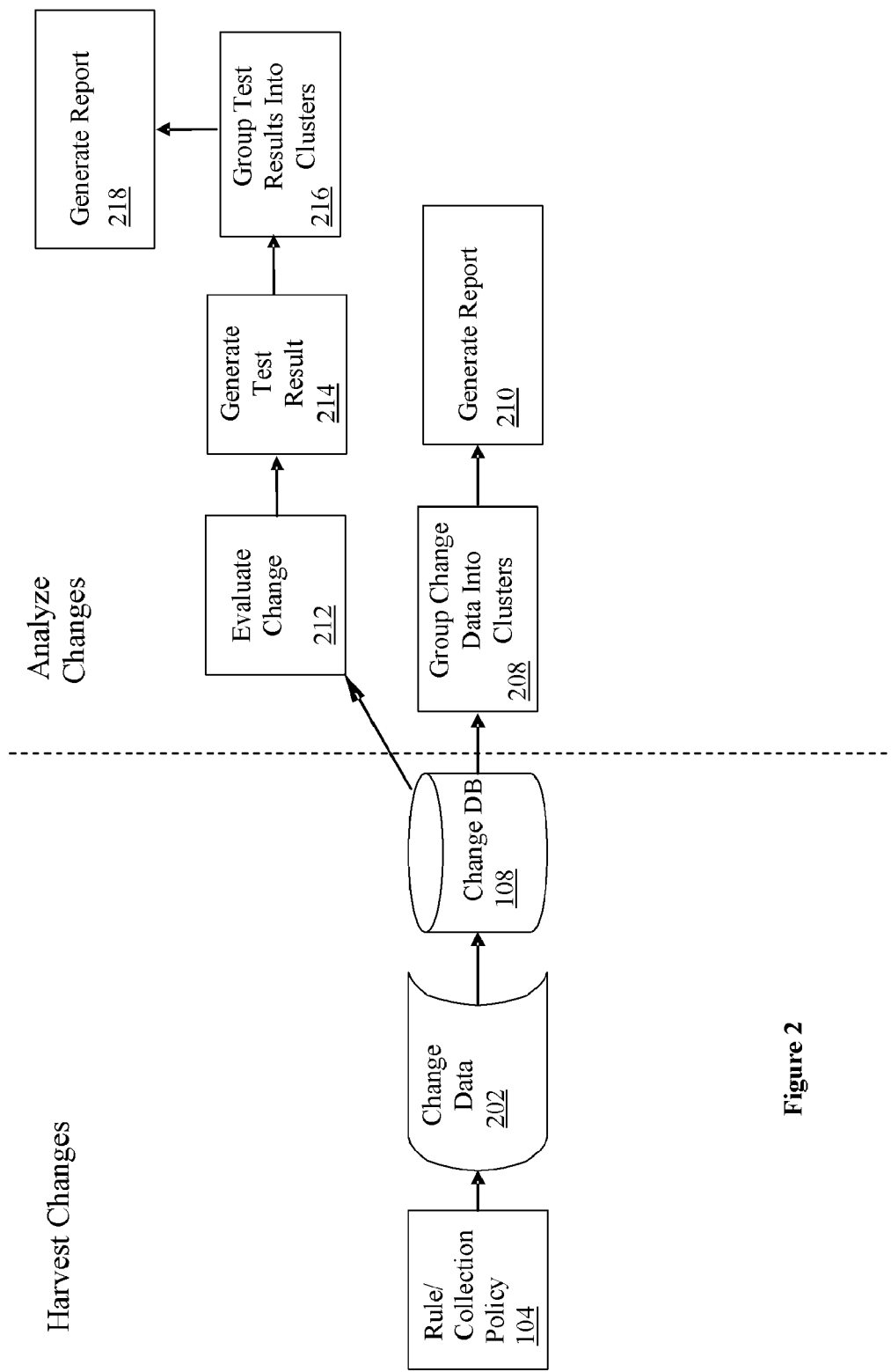
FIG. 2 illustrates an operational overview of a change collection and analysis, in accordance with various embodiments.

FIG. 2 illustrates an operational overview of change collection and analysis, in accordance with various embodiments. In various embodiments, collecting change data 202 may be accomplished by logic of the target host collecting all changes that are captured/detected on the target host, or may be accomplished by logic of the target host applying collection policies of rules to changes that are captured/detected on the target host. In various embodiments, the captured/detected change may be associated with other descriptive data to form change data 202. For example, the change data 202 for a given change may include an identification of the node or target host 102 on which the change was captured, the rule or collection policy 104 responsible for the capturing of the change (if applied), a name of the data element (such as a rule, setting, or configuration parameter) for which the change was detected, and the element data of the element for which the change was detected. Change data 202 may also simply be a listing of changes.

In some embodiments, the collection policies 104 and the logic for applying them may be used to monitor a remote host. In such embodiments, the collection policies 104 and logic may be located on monitor server 106, or another device, and may be used to remotely detect changes on target host 102. Changes may be detected and collected automatically or manually. Changes may be detected and collected periodically or when simply desired.

In various embodiments, upon being generated, change data 202 may be stored in change database 108. As mentioned above, in some embodiments change database 108 may be a database of the monitor server 106. In other embodiments, change database 108 may reside on a different computing device then monitor server 106. For example, change database 108 may reside on a database server device that is communicatively coupled to monitor server 106. Further, in various embodiments, change database 108 may be any sort of database known in the art, such as a relational database, a normalized or de-normalized database, a data structure, or an unformatted file. In some embodiments, change database 108 may store all change data 202 received from target hosts. In some embodiments, change database 108 may have a data retention policy and may discard change data 202 after a specified/pre-determined duration of time.

In some embodiments, the monitor server 106 then generate a change data report based on the collected change data and may store the report or provide it to the target host 102, an administrative user through a user interface of monitor server 106, and/or some other system.

The change data report generally includes numerous instances of changes within change data 202. Indeed, the number of instances of changes may number in the thousands. Thus, a user analyzing the change data report may have difficulty ascertaining how or what caused all of the changes. However, in many circumstances, many of the changes are based upon a common known change that has occurred within the target host, or over the entire enterprise or system being monitored. For example, if a new software application has been loaded onto the target host, then, as known to those skilled in the art, there will be numerous changes throughout the target host.

Thus, in accordance with the various embodiments of the present invention, the monitor server 106, upon receiving the change data associated with a plurality of changes captured on the target host 102 may analyze the change data in order to group 208 the instances of changes into clusters of changes that may be related, i.e., may be related as to a cause or reason for the changes. Various statistical techniques and inference techniques may be used to cluster the instances of changes into the various clusters. Such techniques are generally well-known to those skilled in the art and are generally based upon known occurrences or events. For example, given the known installation of a new software application, the monitor server 106 may analyze and classify the instances of changes based upon anticipated changes that would be expected to occur given the installation of the new software application.

Once the change data have been classified as clusters, a classification report may be generated 210 providing classification or categorization and cluster information for the various changes. A user viewing such a classification report may now only have a few clusters or categories of changes to analyze as opposed to the potential thousands of individual changes. The report may indicate that at least one of the categories or clusters of changes relates, for example, to the installation of the new software application. The user may then determine whether the changes are acceptable or whether certain adjustments to the changes need to be made to bring the changes, settings, parameters, rules, etc., into compliance with the compliance policy.

In accordance with various embodiments of the present embodiments, the monitor server 106 may apply a compliance policy 110 to change data 202 to determine whether the one or more rules, settings, and/or configuration parameters specified in the change data 202 meet one or more compliance policies 110. As illustrated, that determining may comprise evaluating 212 an expression specified in a compliance policy 110 against element data specified in the change data 202.

In various embodiments, the monitor server 206 may generate 214 one or more test results based on the determining/evaluating. The test result may indicate either that the rule, setting, or configuration parameter specified in change data 202 is in compliance or not in compliance with compliance policy 110. In various embodiments, the test results may then be stored in a test results database (not illustrated). In one embodiment, the test results database may be identical to the change database.

In some embodiments, the monitor server 106 may generate a test results report based on the test results and may store the report or provide it to the target host 102, an administrative user through a user interface of monitor server 106, and/or some other system. The test results report may include an indication of whether or not a given rule, setting, or parameter is in compliance and, if not in compliance, an indication of what an appropriate value or values for a compliant rule, setting, or parameter would be. In one embodiment, the monitor server 106 may provide the report to an industry standards/compliance monitoring organization.

The test results report generally includes numerous test results and may number in the thousands. Thus, a user analyzing the test results report may have difficulty ascertaining how or what caused all of the changes that resulted in the test results. However, in many circumstances, many of the test results are based upon a common known change that has occurred within the target host, or over the entire enterprise or system being monitored. For example, if a new software application has been loaded onto the target host, then, as known to those skilled in the art, there will be numerous changes throughout the target host.

Thus, in accordance with the various embodiments of the present invention, the monitor server 106, upon receiving the test results associated with a plurality of changes captured on the target host 102 may analyze the test results in order to group 216 the test results into clusters of test results that may be related, i.e., may be related as to a cause or reason for the changes that led to the test results. Various statistical techniques and inference techniques may be used to cluster the test results into the various clusters. Such techniques are generally well-known to those skilled in the art and are generally based upon known occurrences or events. For example, given the known installation of a new software application, the monitor server 106 may analyze and classify the test results based upon anticipated changes that would be expected to occur given the installation of the new software application.

Once the test results have been classified as clusters, a classification report may be generated 218 providing classification or categorization and cluster information for the various changes that resulted in the test results. A user viewing such a classification report may now only have a few clusters or categories of test results/changes to analyze as opposed to the potential thousands of individual test results/changes. The report may indicate that at least one of the categories or clusters of test results/changes relates, for example, to the installation of the new software application. The user may then determine whether the changes are acceptable or whether certain adjustments to the changes need to be made to bring the changes, settings, parameters, rules, etc., into compliance with the compliance policy.

Figure 3:
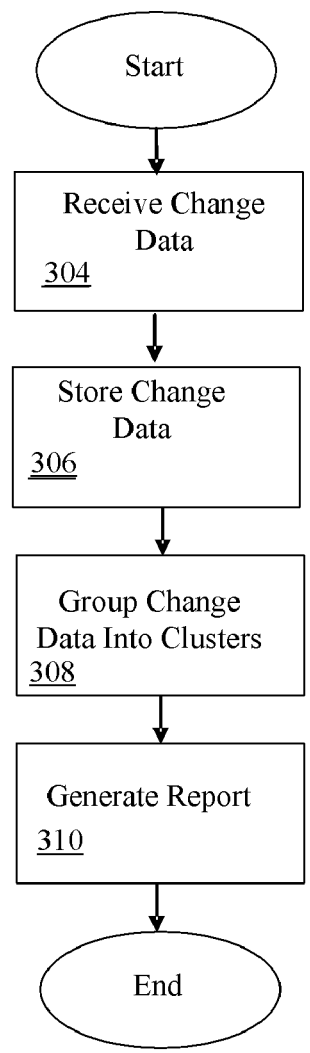
FIG. 3 illustrates a flow chart view of selected operations of the methods of various embodiments.

FIG. 3 illustrates a flow chart view of selected operations of the methods of various embodiments. As illustrated, a monitor server may receive change data captured on a target host, block 304, the target host providing the change data in response to detecting changes, and the change data including one or more rules, settings, and/or parameters.

As is further illustrated, the monitor server may store the received change data in a change database, block 306. The monitor server may correlate the change data with one or more change catalogs in order to group the change data into clusters, block 308. Once the change data has been classified as clusters, a report may be generated providing classification and/or categorization and cluster information for the various changes, block 310. In such embodiments, the generating may comprise generating a report to the target host and/or to an administrative user.

FIG. 4 illustrates an exemplary computer system suitable for use to practice aspects of various embodiments. As may be seen, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM), a disc storage device, and so forth), input/output devices 408 (such as display, keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not illustrated).

Each of these elements performs its conventional functions known in the art. In particular, system memory 404 and mass storage 406 may be employed to store a working copy and a permanent copy of the programming instructions implementing one or more aspects of the above described teachings to practice the various embodiments, herein collectively denoted as 422. The various components may be implemented by assembler instructions supported by processor(s) 402 or high-level languages, such as, for example, C, that may be compiled into such instructions.

The permanent copy of the programming instructions may be placed into permanent storage 406 in the factory, or in the field, through, for example, a distribution medium (not illustrated), such as a compact disc (CD), or through communication interface 410 (from a distribution server (not illustrated)). That is, one or more distribution media having an implementation of the agent program may be employed to distribute the agent and program various computing devices.

The constitution of these elements 402-412 are generally known to one skilled in the art, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium and configured to program a target host to detect a change to a rule, setting, or parameter based on a collection policy defining what change data is to be collected by the target host, and provide data associated with the rule, setting, or parameter as change data to a monitor server. The monitor server may determine whether the rule, setting, or parameter meet one or more compliance policies. In other exemplary embodiments, the plurality of programming instructions may be configured to program a monitor server to receive data associated with a change captured on a target host, the target host providing the data in response to detecting the change, and the data including one or more rules, settings, and/or parameters. The instructions may further be configured to correlate the change data with one or more change catalogs in order to group the change data into clusters. The instructions may also further be configured to generate a report providing classification and/or categorization and cluster information for the various changes.

Although specific embodiments have been illustrated and described herein, it will be appreciated by those of ordinary skill in the art that a wide variety of alternate and/or equivalent implementations may be substituted for the specific embodiments illustrated and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method comprising:

receiving, by a computing device executing programming instructions for a monitor server, change data associated with a plurality of changes captured on a target host, the target host providing the change data in response to detecting the plurality of changes to target host data using one or more rules or collection policies to capture the changes, wherein the change data includes at least one or more of the following: rules, settings, or parameters;

analyzing, by the monitor server, the change data in order to group the change data into clusters;

classifying, by the monitor server, the clusters relating to at least one potential reason for the plurality of changes in order to categorize at least some of the clusters;

determining, by the monitor server, whether the change data violate one or more compliance policies;

generating, by the monitor server, one or more test results based at least on the results of the determining;

analyzing, by the monitor server, the one or more test results in order to group the one or more test results into test result clusters; and classifying, by the monitor server, the test result clusters relating to at least one potential reason for the plurality of changes in order to categorize at least some of the test result clusters.

2. The method of claim 1, wherein the classifying the clusters comprises inferring a categorization for at least some of the clusters based upon at least one known enterprise change.

3. The method of claim 1, wherein the change data includes a rule that generated the change, the target host or node from which the change data was collected, a specific element name associated with the change, and element data associated with the change.

4. The method of claim 1, further comprising generating a report, the report relating the categorization of the at least some of the clusters.

5. The method of claim 1, wherein each compliance policy includes at least one or more of the following: a rule, a change name, one or more waivers from the policy, or an expression for evaluating element data of the change.

6. The method of claim 1, further comprising filtering, by the monitor server, the received change data and conditionally performing the determining based on a result of the filtering.

7. The method of claim 1, wherein the determining comprises evaluating an expression of at least one of the compliance policies against element data specified in the change data.

8. The method of claim 1, further comprising generating a report, the report relating the categorization of the at least some of the test result clusters.

9. A monitor server residing on a computing device comprising:

a processor;

a change database for storing change data associated with a plurality of changes captured on a target host, the target host providing the change data to the monitor server in response to detecting the plurality of changes, wherein the change data includes at least one or more of the following: rules, settings, or parameters; and one or more logic components communicatively coupled to the change database and to be operated by the processor to:

receive the change data;

store the change data in the change database;

analyze the change data in order to group the change data into clusters;

classify the clusters relating to at least one potential reason for the plurality of changes in order to categorize at least some of the clusters;

determine whether the change data violate one or more compliance policies;

generate one or more test results based at least on the results of the determining;

analyze the one or more test results in order to group the one or more test results into test result clusters; and classify the test result clusters relating to at least one potential reason for the plurality of changes in order to categorize at least some of the test result clusters.

10. The monitor server of claim 9, wherein the logic is further to:

classify the clusters relating to a potential reason for the plurality of changes by inferring a categorization for at least some of the clusters based upon at least one known enterprise change.

11. The monitor server of claim 9, wherein the logic is further to:

generate a report, the report relating to the categorization of the at least some of the clusters.

12. The monitor server of claim 9, wherein the compliance policies ensure that the target host is in compliance with one or more standards.

13. The monitor server of claim 9, wherein the logic is further to:

filter the received change data and conditionally perform the determining based on a result of the filtering.

14. The monitor server of claim 9, wherein the logic is further to:

evaluate an expression of at least one of the compliance policies against element data specified in the change data.

15. The monitor server of claim 9, wherein the logic is further to:

generate a report, the report relating to the categorization of the at least some of the test result clusters.

16. An article of manufacture comprising:

a storage medium; and a plurality of programming instructions stored on the storage medium and configured to program a computing device executing a monitor server to:

receive change data provided by a target host in response to detecting one or more changes captured on the target host, wherein the change data includes at least one or more of the following: rules, settings, or parameters;

analyze the change data in order to group the change data into clusters;

classify the clusters relating to at least one potential reason for the plurality of changes in order to categorize at least some of the clusters;

determine whether the change data violate one or more compliance policies;

generate one or more test results based at least on the results of the determining;

analyze the one or more test results in order to group the one or more test results into test result clusters; and classify the test result clusters relating to at least one potential reason for the plurality of changes in order to categorize at least some of the test result clusters.

17. The article of manufacture of claim 16, wherein the plurality of programming instructions is further configured to program the monitor server to:

classify the clusters relating to a potential reason for the plurality of changes by inferring a categorization for at least some of the clusters based upon at least one known enterprise change.

18. The article of manufacture of claim 16, wherein the plurality of programming instructions are configured to generate a report based at least on the results of the classifying by the monitor server.

* * * * *